Sept. 5, 1950 K. RATH 2,521,093
CAMERA WITH PHOTOELECTRIC EXPOSURE CONTROL
HAVING PHOTOCELL SHUTTERS CONNECTED
TO CAMERA ADJUSTING MEANS Filed May 26, 1948 2 Sheets-Sheet 1

INVENTOR.

Kurt Rath

Sept. 5, 1950

K. RATH 2,521,093

CAMERA WITH PHOTOELECTRIC EXPOSURE CONTROL
HAVING PHOTOCELL SHUTTERS CONNECTED
TO CAMERA ADJUSTING MEANS

Filed May 26, 1948

INVENTOR.

Karl Rath

Patented Sept. 5, 1950

2,521,093

UNITED STATES PATENT OFFICE 2,521,093

CAMERA WITH PHOTOELECTRIC EXPOSURE CONTROL HAVING PHOTOCELL SHUTTERS CONNECTED TO CAMERA ADJUSTING MEANS

Karl Rath, New York, N. Y.

Application May 26, 1948, Serial No. 29,313

3 Claims. (Cl. 95—10)

This application is a continuation in part of my co-pending application Serial Number 565,217, filed November 27, 1944, entitled "Photographic Exposure Control."

The present invention relates to photography, more particularly to an improved system of photoelectric exposure control to insure correctly exposed photographs under varying scene or object brightness conditions.

An object of the invention is to provide an improved exposure control system which will enable a selective distribution of a given scene or object brightness upon the main factors controlling the exposure of a camera, viz. shutter speed or exposure time and lens speed or f-stop; which is both simple in construction and easy to operate without any special skill; which may be easily structurally combined with existing camera and shutter designs; and which will be reliable in operation and free from the defects and errors caused by alterations or adjustments in the photoelectric circuit of the device.

Another object is to provide a camera construction of the collapsible bellows type especially, though not limitatively, suited for combination with an exposure control system proposed by the invention.

Other objects are to provide a camera construction which is both compact and of small and convenient shape in the collapsed position and which will enable the provision of a range finder coupled with the focusing adjustment substantially without the use of collapsible mechanical elements likely to impair the mechanical rigidity and accuracy of the focusing adjustment during use.

Further objects and novel features of the invention will become more apparent from the following detailed description taken in reference to the accompanying drawings forming part of this specification and wherein.

Like reference numerals identify like parts throughout the different views of the drawings.

Figure 1:
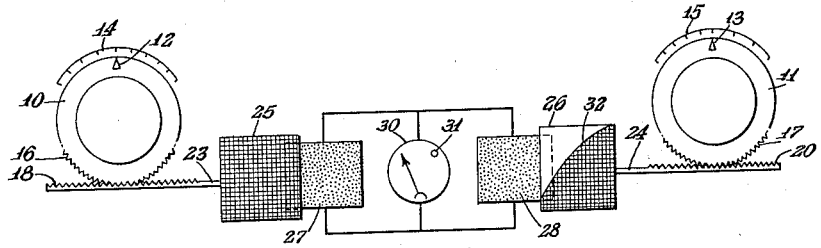
Figure 1 is the diagrammatic representation of a semiautomatic exposure control system constructed in accordance with the principles of the invention.

Referring to Figure 1, there are shown at 10 and 11 the adjusting members for the exposure time or shutter speed and for the lens aperture or f-stop, respectively, of a photographic camera, which may be in the form of adjusting rings mounted upon a central or between-the-lens shutter of known construction. Members 10 and 11 are provided with index or adjusting marks 12 and 13 arranged to cooperate with stationary shutter speed and f-stop scales 14 and 15, respectively, in accordance with well known practice. Members 10 and 11 are constructed in the form of gears or provided with toothed peripheral sections 16 and 17 engaging a pair of racks 18 and 20, respectively. Attached to the inner ends 23 and 24 of racks 18 and 20 are a pair of shutters or screens 25 and 26 arranged to cover varying areas of a pair of photovoltaic cells 27 and 28, respectively. In this manner, the photoelectric currents produced by the cells 27 and 28 may be varied in accordance with the adjustment of the factors controlling an exposure, viz. and shutter speed and f-stop, in a manner as will be readily understood. The photovoltaic cells 27 and 28 may be of the well known selenium-on-iron type capable of producing electric currents which are directly proportional to the intensity of the light rays impinged upon the exposed sensitive areas of the cells.

Both photoelectric cells 27 and 28 are connected in shunt or parallel and across a common current indicator or microammeter 30 which is provided with a fixed adjusting or fiduciary mark 31. Accordingly, upon operating the adjusting members 10 and 11 so as to cause the pointer or needle of the indicator 30 to coincide with the mark 31, or, in other words, by reducing the sum of the photoelectric currents generated by the cells 27 and 28 to a fixed or predetermined value by selective control of each current by the respective exposure adjustment, a given scene or object brightness may be selectively matched against or distributed upon both factors controlling the exposure of the camera, viz. shutter speed and f-stop, in such a manner as to insure a correctly exposed photograph under varying scene or object brightness conditions. An arrangement of a similar type, but using adjustable resistors in the circuits of the photoelectric cells, is described in my U. S. Patent #2,354,544 entitled "Automatic Exposure Control," issued July 25, 1944.

Thus, the invention makes it possible to preselect a given shutter speed by operating member 10 to a point where the mark 12 will be opposite to the proper shutter speed number on scale 14 and by then operating member 11 until the pointer of the instrument 30 coincides with the adjusting mark 31, in which case the lens aperture adjustment will be automatically set to the proper value to insure a correctly exposed photograph. On the other hand, if a certain f-stop is required such as in order to secure a desired depth of focus, member 11 is preset to cause the mark 13 to be opposite the desired stop number upon scale 15, whereupon adjustment of the member 10 to cause the meter reading to coincide with the adjusting mark 31, will result in the proper shutter speed setting for obtaining a correctly exposed picture under the existing scene or object brightness conditions. In order to properly correlate the non-linear f-stop scale 15 with the operation of the shutter of screen 26, the latter is suitably shaped to have a curved edge or contour 32 between its opaque and light transmitting portions following a square-law curve. The screen 25 coupled with the shutter speed adjustment, on the other hand, is designed with a straight edge in the manner shown for directly varying the current of the photoelectric cell in proportion to the shutter speed or exposure time adjustment. The screens or shutters 25 and 26 may be made of opaque sheet material provided with suitable openings or cut-outs, or they may be of transparent material coated with an opaque area, as will be readily understood.

An advantage of an exposure control system described hereinbefore, aside from its simplicity from a mechanical point of view, is due to the fact that the photovoltaic cells 27 and 28 are permanently connected to the current indicator 20 without any alterations in the electrical circuits, whereby to insure maximum sensitivity of the light or brightness indication as well as constant operating conditions and characteristics at all times. This, in turn, results in an increased accuracy and reliability of the exposure control.

Since the photoelectric cells 27 and 28 have a relatively large internal resistance compared with the resistance of the microammeter 30, the presence of one cell in parallel to the other cell will have substantially no effect upon the operation of the latter, whereby to substantially eliminate the difficulties hereinbefore experienced in connection with multiple or selective exposure control systems of this type.

As will be understood, the invention may be used with equal advantage in both still and motion picture cameras, in which latter case the adjustment 10 serves to control the frame number or speed of the camera. In order to take into consideration film sensitivity or other secondary exposure controlling factors, a third photoelectric cell may be connected in parallel to the cells 27 and 28 and the current of the third cell contributed to the total current through the indicator 30 adjusted by means of a shutter or screen similar to the screens 25 and 26 in accordance with the additional exposure controlling factor. Alternatively, film speed may be considered by varying the sensitivity of the indicator by the aid of an adjustable shunt resistance, in a manner well known in connection with photoelectric exposure control devices.

Figure 2:
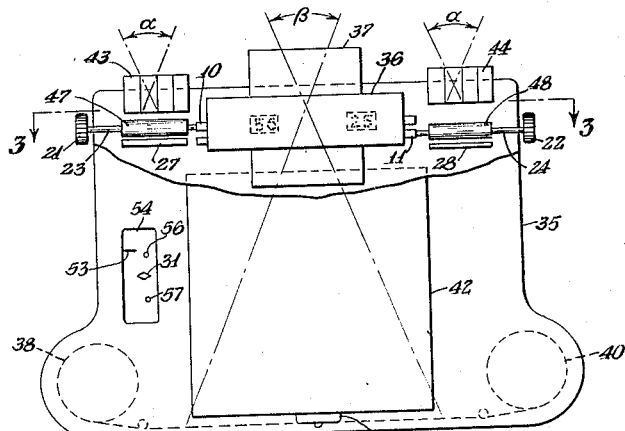
Figure 2 is a top view of a reflex camera with parts broken away and embodying exposure control means of the type shown in Figure 1.

Referring to Figure 2, there is shown a single lens reflex camera embodying a semi-automatic exposure control device of the type shown in Figure 1. The camera shown being of standard construction comprises a body or casing 35, a between-the-lens shutter 36 and lens 37 mounted in the front wall of said casing, film supply and take-up spools 38 and 40 with means (not shown) for moving a film 41 through the film gate in the focal plane of the camera and a collapsible viewing hood 42, all of which may be of well known construction known in the art. Other details, such as the focusing adjustment, the reflecting mirror, etc., have been omitted from the drawing as being well known to those skilled in the art and unnecessary for the understanding of the present invention.

The photoelectric cells 27 and 28 are shown mounted on opposite sides of the shutter 36 and provided with suitable baffles or acceptance angle limiting means in the form of grilles 43 and 44 or the like, mounted in the front wall of the casing 35, whereby to limit the acceptance angles $\alpha$ of the cells to correspond to the picture angle $\beta$ of the lens 37. The adjustable screens or shutters for the photocells are constructed in the form of roller curtains 47 and 48 mounted between the grilles 43, 44 and the photoelectric cells 27 and 28, respectively, and being provided with suitable opaque and light transmitting areas, as shown more clearly in Figure 3. The curtains 45 and 46 comprise upper and lower rollers 47, 48 and 50, 51, respectively. The lower rollers 50 and 51 are mounted upon shafts 23 and 24 projecting beyond the camera casing 35 and carrying suitable control members or knobs 21 and 22. The inner ends of shafts 22 and 23 carry worm gears 18' and 20', meshing with the adjusting gears 16 and 17, respectively, the latter replacing the racks 18 and 20, shown in Figure 1. By the use of roller curtain shutters of this type which may be suitably spring loaded and are adjusted by means of the control members 21 and 22, the space required for the control elements will be considerably reduced, whereby to enable an easy mounting or incorporation of the exposure control mechanism in existing camera and shutter constructions, substantially without increasing the size and bulk of a camera.

The photoelectric cells 27 and 28 are directly connected in shunt to a microammeter (not shown) which is suitably mounted within the camera casing and has a pointer 31 visible through a window 54 in the top wall of the camera and cooperating with the adjusting or fiduciary mark 31. Two further adjusting marks 56 and 57 have been shown arranged on opposite sides of the mark 31 for carrying out a selective exposure adjustment based upon the shadow or highlight portion of a scene or object, in a manner described in detail in the above mentioned co-pending application.

Figures 3, 3A:
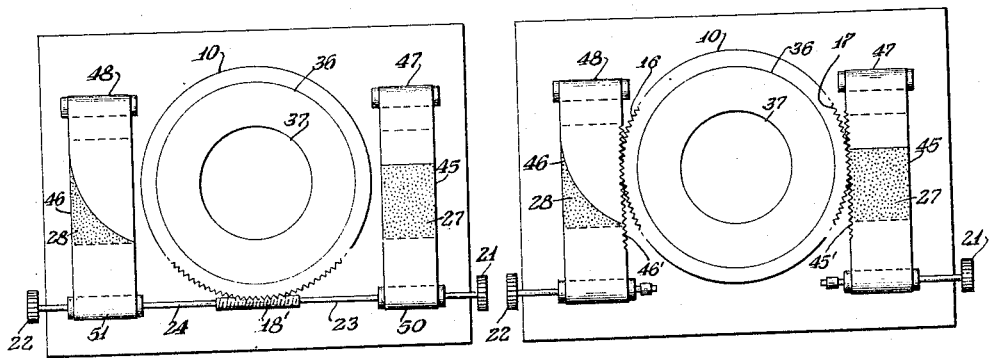
Figure 3 is a sectional view taken on line 3—3 of Figure 2.
Figure 3A is a view similar to and showing a modification of Figure 3.

In Figure 3A, there is shown a somewhat modified construction, wherein the curtains 45 and 46 which may consist of metal and are suitably spring loaded are provided with lateral teeth or serrations 45' and 46', respectively, directly engaging the toothed sections 16 and 17 of the exposure control members 10 and 11, in the manner shown in the drawing.

Figure 4:
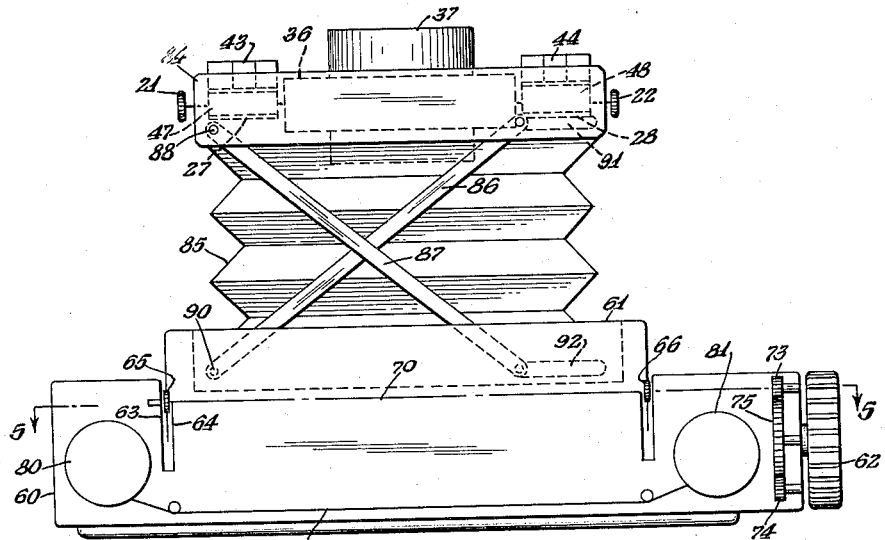
Figure 4 is a top view of an improved collapsible bellows type camera embodying an exposure control device according to the invention.
Figure 5:
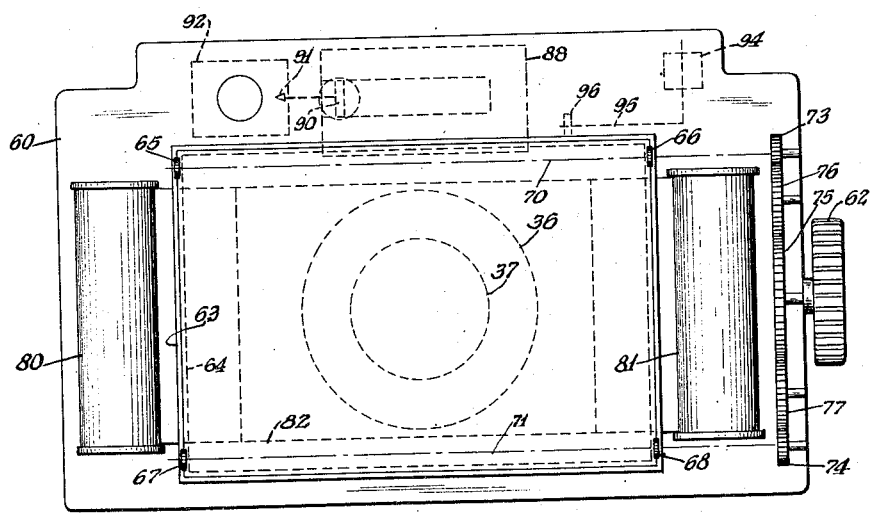
Figure 5 is an elevational view and partial cross-section taken on line 5—5 of Figure 4.

Referring to Figures 4 and 5, there is shown a collapsible bellows type camera embodying an exposure control system of the above type. The camera shown comprises a relatively flat main body or casing 60 having an open end within which is mounted in relative sliding engagement a second casing 61 extensible from and retractable into the casing 60 by operating an adjusting or focusing knob 62, casing 61 being substantially flush with casing 60 in the completely retracted position. In order to provide a light proof connection and an accurate parallel guidance between the casings 60 and 61, the former is provided with a re-entrant portion 63 having an edge bent upon itself to form a guiding channel for the open edge of the casing 61. Adjustment of the latter is effected by the provision of two pairs of gears 65, 66 and 67, 68, the former being mounted upon a shaft 70 and engaging suitable racks or toothed slots in the upper side wall portions of casing 61 and the latter being mounted upon a shaft 71 engaging racks or toothed slots in the lower side wall portions of casing 61. Shafts 70 and 71 are connected to gears 73 and 74 which in turn mesh with a gear 75 mounted upon the shaft of the focusing knob 62 through a pair of intermediate gears 76 and 77, respectively. As is understood, any other adjusting and parallel guide arrangement for the casing 61 may be employed for the purpose of the invention. Items 80 and 81 indicate the film supply and take-up spools, suitable means (not shown) being provided for moving the film 82 through the picture gate in the focal plane, in a manner well known and understood by those skilled in the art.

Connected to the sliding casing 61 is a collapsible dark chamber comprising a front panel 84, a bellows 85 and a collapsible linkage arrangement such as a pair of lazy tongue members 86 and 87 pivoted to casing 61 and panel 84 at 90 and 88, respectively, and cooperating with slots 91 and 92 in the members 84 and 61, to insure exact parallelism of the lens 37 mounted in the panel 84 in the extended position shown in the drawing. An exposure control mechanism of substantially the same type as shown in Figure 2 is associated with the shutter 36 mounted within the panel 84, like reference numbers identifying like elements in both Figures 2 and 4. The electrical indicator is mounted upon the main body 60 as indicated in Figure 5, the indicator comprising in a known manner a permanent magnet 88, a moving coil 90 and a pointer 91 having its end extending into the field of an optical view finder 92, whereby to enable operation of the exposure control in the viewing or picture taking position of the camera. The electrical connections between the photoelectric cells 27 and 28 with the indicator coil 80 may be effected by means of suitable flexible leads or insulated wires secured to or mounted in suitable grooves of the linkage members 86 and 87. Alternatively, the electrical connection may be made through flexible leads or connectors arranged inside the bellows, 85.

A camera construction of this type has the advantage of being flat and compact in the non-use or collapsed position, with the casing 61 being completely retracted into the casing 60 and with the lens panel 84 and bellows 85 being collapsed into the casing 61. Another advantage is due to the fact that the focusing of the lens 31 may be effected without varying the relative position between the casing 61 and panel 84 which accordingly may be constructed to insure sufficient rigidity and freedom from wear and consequent impairment of the accuracy of the focusing adjustment during use.

Furthermore, the improved construction according to the invention enables a simple and easy mounting of a coupled range finder upon the camera body, without requiring mechanical or optical connecting members between the adjustable range finder members and the lens focusing elements. Thus, the pivoted mirror or adjusting prism 94 of a standard coincidence type range finder mounted upon the camera casing 61 is shown directly mechanically coupled with the sliding or focusing casing 61, such as by way of a lever 95 cooperating with a cam 96 mounted upon the casing 61. The mirror or prism 94 is arranged in the path of a first light beam entering a first window in the front of the camera, the second cooperating light beam entering through a window spaced from said first window or through the view finder 92 in case of combined view finder and focusing arrangement of well known construction.

While there have been disclosed and shown a few desirable embodiments of the invention, it is understood that this disclosure is for the purpose of illustration and that various changes in shape, proportion and arrangement of parts, as well as the substitution of equivalent elements for those herein shown and described, may be made without departing from the spirit and broader scope of the invention as defined in the appended claims. The specification and drawings are, accordingly to be regarded in an illustrative rather than a limiting sense.

I claim:

1. The combination with a photographic camera having ring-shaped lens aperture and shutter speed adjusting members each provided with peripheral gear teeth, a pair of photovoltaic cells mounted upon said camera for producing a pair of electric currents proportional to the brightness of a scene to be photographed, a current indicator having index means for indicating a predetermined current, means for electrically connecting said cells to said indicator in shunt relation to produce a combined additive response of said indicator by said currents, a first roller curtain having a toothed edge engaging the teeth of one of said adjusting members to adjust said curtain in accordance with the setting of said member, a second roller curtain having a toothed edge engaging the teeth of the other adjusting member to adjust said last mentioned curtain in accordance with the setting of said last adjusting member, both said curtains having opaque and light transmitting areas, whereby to vary said photoelectric currents in accordance with the shutter speed and lens aperture settings, respectively, of said camera.

2. In an arrangement as claimed in claim 1, wherein the curtain coupled with the shutter speed adjusting member has a straight contour between its opaque and light transmitting areas and the curtain coupled with the aperture adjusting member has a square-law shaped contour between its opaque and light transmitting areas.

3. In a photographic camera having a shutter provided with lens aperture and shutter speed control gears, a pair of photovoltaic cells mounted upon said camera, a current indicator having index means for indicating a predetermined current, means for electrically connecting said cells to said indicator in shunt relation to produce a combined additive response of said indicator by the currents generated by both said cells, a first roller curtain shutter having a toothed edge in meshing relation with one of said control gears, a second roller curtain shutter having a toothed edge in meshing relation with the other of said control gears, both said shutters having areas of varying light transmission, whereby to vary said currents in accordance with the shutter speed and lens aperture settings, respectively, of said camera.

KARL RATH.

REFERENCES CITED

The following references are of record in the file of this patent:

UNITED STATES PATENTS

| Number | Name | Date |
|---|---|---|
| 2,000,037 | Riszdorfer | May 7, 1935 |
| 2,047,257 | Crumrine | July 14, 1936 |
| 2,132,549 | Wenstrom | Oct. 11, 1938 |
| 2,285,761 | Tonnies | June 9, 1942 |
| 2,330,877 | Fleischer et al. | Oct. 5, 1943 |
| 2,354,544 | Rath | July 25, 1944 |
| 2,407,917 | Bolsey | Sept. 17, 1946 |
| 2,411,486 | Weisglass | Nov. 19, 1946 |
| 2,413,017 | Willcox | Dec. 24, 1946 |